Sept. 16, 1930. L. L. STEINDLER 1,775,702
HEATING SYSTEM AND APPARATUS
Filed April 4, 1928
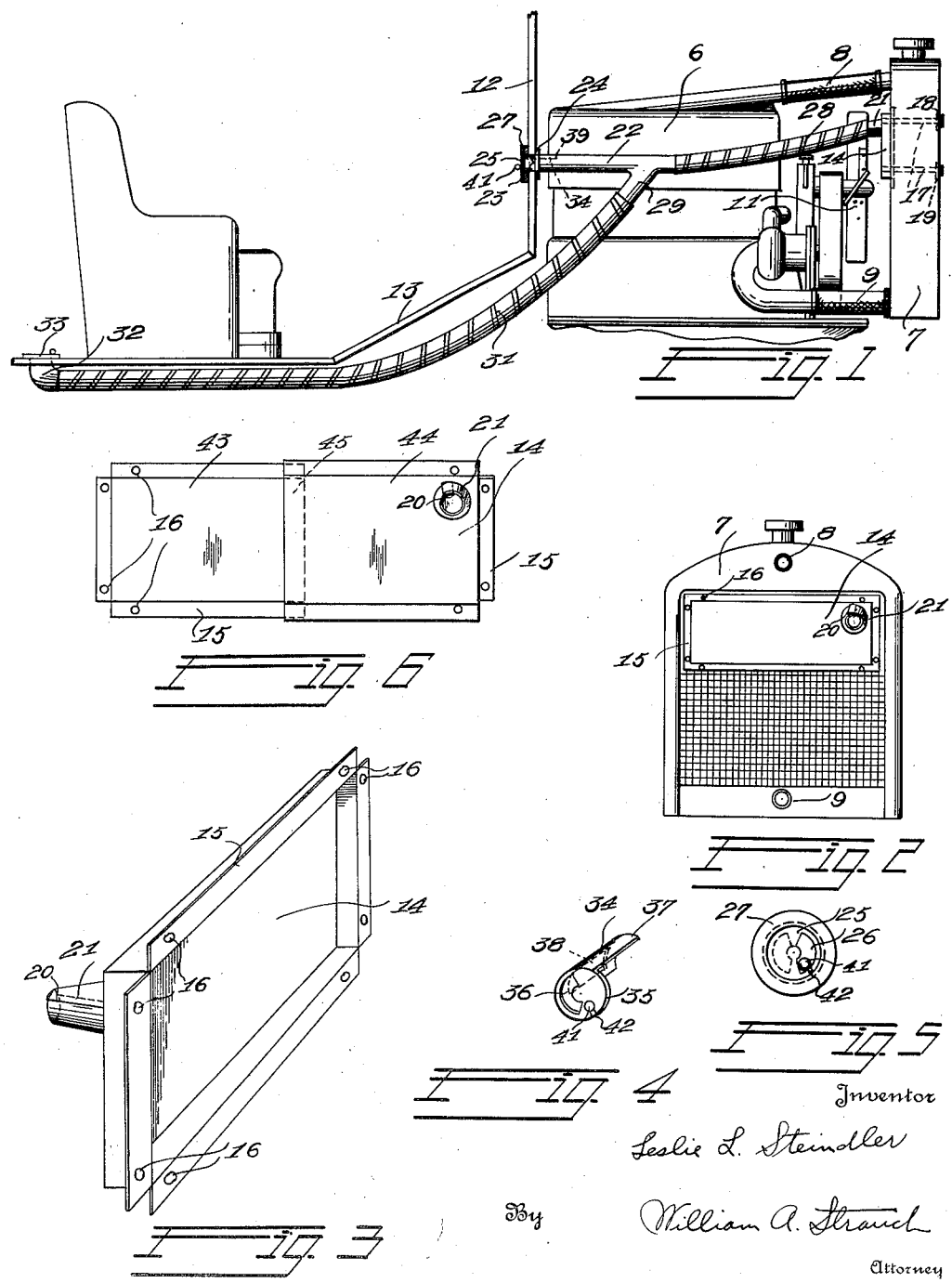
Inventor
Leslie L. Steindler
By William A. Strauch
Attorney Patented Sept. 16, 1930

1,775,702

UNITED STATES PATENT OFFICE

LESLIE L. STEINDLER, OF MAMARONECK, NEW YORK, ASSIGNOR OF ONE-FOURTH TO CHARLES B. WATERS, OF MONTCLAIR, NEW JERSEY

HEATING SYSTEM AND APPARATUS

Application filed April 4, 1928. Serial No. 267,338.

The present invention relates to automobile heating systems and apparatus.

More specifically the invention relates to a heating system and apparatus utilizing as a heating medium the hot water of the engine cooling system of the automobile.

Systems and apparatus have heretofore been proposed for heating automobiles in which a restricted quantity of water was diverted from the engine cooling system and circulated through suitable heat radiating members located in the automobile. Such arrangements when of proper design and proportions give satisfactory heating but necessitate tapping into the water circulating system of the engine and the use of comparatively expensive heater constructions in the car body. Tapping into the circulating system is frequently considered objectionable and the cost of the special heater constructions renders such installations comparatively high priced. These installations may not be made on cars using what is generally termed the thermo-siphon system of circulation.

Other systems and apparatus have heretofore been proposed for heating automobiles utilizing air from underneath the hood heated in contact with the exhaust manifold. Such systems have invariably utilized a funnel located under the hold and are objectionable due to danger of fumes from the crank case, breather cap, oil which may be on the motor or exhaust manifold, and exhaust gases which may leak through the exhaust manifold being picked up by the funnel and forced into the car body with the heated air by the action of the engine fan, thus endangering the occupants of the automobile as well as causing unpleasant odors in the car body.

It is accordingly an object of the present invention to provide a comparatively low cost heating system and apparatus readily installed on any well known automobile or motor vehicle that will efficiently heat the vehicle body without danger of obnoxious gases entering the body and applicable to automobiles with or without a circulating pump in the engine cooling system, and which will not substantially alter or interfere with the functioning of the usual engine fan or cooling arrangements.

It is another object of the invention to provide a heating system and apparatus for automobiles in which a portion of the heat generated in the cooling system is utilized to supply the desired heat without diverting any of the cooling fluid or medium from the cooling system.

A further object of my invention is to provide heating systems and apparatus of the character that will efficiently heat an automobile without impairing the efficiency of the engine cooling system at atmospheric temperatures at which heating is desired.

A still further object of the invention is to provide apparatus for heating automobiles which is simple in construction, inexpensive to manufacture and which can be installed expeditiously with very slight alterations in the usual automobile constructions.

With these objects in view, as well as others that will become apparent from the following disclosure and the appended claims, reference will be had to the accompanying drawing forming a part thereof and in which—

Figure 1 is a side elevational view, more or less diagrammatic in nature illustrating the radiator, engine, and dash of any well known make of automobile and showing the application of a preferred form of my invention thereto.

Figure 2 is an inside elevational view of an automobile radiator disclosing one way in which the heater box is secured thereto.

Figure 3 is a perspective view of a heat collecting box used in the preferred form of my invention.

Figure 4 is a perspective view of a valve for controlling the admission of air to the automobile body in a preferred embodiment of my invention.

Figure 5 is an end view of the valve shown in Figure 4 in assembled position, and Figure 6 is an outside plan view of a modified form of heater box for use with my invention.

Referring to the drawing by reference characters in which like characters designate like parts, 6 designates the engine of an automobile or motor vehicle which is provided with a cooling jacket in communication with the cooling radiator 7 for the cooling medium through conduits 8 and 9 and a suitable fan 11 driven from the engine is interposed between engine 6 and radiator 7 in well known manner. The reference character 12 designates the dash and 13 the floor of an automobile.

My improved heating apparatus in its preferred form comprises a shallow metallic box or casing 14 with its forward face open, and secured to the upper inner face of the radiator core (Figure 1) in front of fan 11 in such manner that air or gases from the back of the radiator and drafts induced by the fan are excluded from the interior of the box. Box 14 as shown in Figure 2 is of a length substantially equal to the width of the radiator core and is of a depth sufficient to permit effective circulation of air through the cellular radiator core structure, a depth of approximately one-half of an inch being satisfactory in practice. Casing 14 is provided with an outwardly extending marginal flange 15 apertured as at 16 for the reception of securing bolts 17 which extend through the radiator core as shown in Figure 1 and are held in position by nuts 18 engaging felt washers 19 to prevent injury to the radiator core. It will, however, be understood that flange 15 may be reduced or eliminated to minimize the radiator area covered, and that bolts 17 may extend directly through the back wall of the box 14.

Casing 14 is provided with a funnel shaped hose-attaching-member 20 which is preferably formed integrally with the casing and is disposed adjacent one end thereof in order that the hose hereinafter described may extend along one side of the engine. Preferably member 20 is slit as indicated at 21 and the slit ends overlap in order that the outer end thereof may be yieldably contractible to facilitate insertion thereof into a hose end. Adapted for connection with dash 12 is a combined valve and hose-attaching member 22 provided with a threaded end 23 (Figure 1) extending through dash 12 and is provided with a flange 24 engaging the outer side of the dash 12. Member 22 is also provided with an end portion 25 having an arcuate opening or aperture 26, and is securely held in dash 12 by means of a nut 27 engaging threaded end 23 and drawn up into engagement with the inner face of dash 12. Instead of securing member 22 in position with nut 27, securing bolts may be provided extending through flange 24 and the dash in obvious manner.

Detachably connected with the opposite or outer end of member 22 and funnel shaped member 21 is a flexible hose or conduit 28 and detachably connected to the end of a branch 29 of member 22 may be a second flexible hose or conduit 31 which is extended back under the floor of the automobile and the end of which is connected to extension 32 of a suitable valve or shutter structure 33 secured in the floor of the rear compartment of the automobile body. The flexible hose connections 28 and 31 are preferably metallic for the sake of durability but hose of other material may be satisfactorily employed and it is obvious that the rear end of hose 31 may be extended through the vertical wall back of the front seat or elsewhere into the car body instead of through the floor as illustrated.

Rotatably mounted in the dash end of member 22 is a valve 34, which, as shown in Figure 4, comprises a disk 35 provided with an arcuate opening or aperture 36 substantially conforming in configuration to aperture 26 in end 25. Valve 34 may also if desired be provided with a segmental cylindrical extension 37 provided with an aperture 38 substantially conforming in configuration to an aperture 39 in member 22. If extension 37 is not used, aperture 39 will of course be eliminated. The relation of openings 26, 36, 38 and 39 is such that when openings 26 and 36 are in alignment, openings 38 and 39 are out of alignment, and when openings 26 and 36 are out of alignment, openings 38 and 39 are in alignment. Disk 35 is provided with a manipulating knob 41 which extends through opening 26 and is provided with an extension 42 overlying one edge of opening 26 to hold valve 34 against longitudinal displacement in member 22.

As the radiators used on many different makes of automobiles vary in width the heater box 14, as illustrated in Figure 6, may be formed of two sections 43 and 44 telescopically connected as indicated at 45 in order that the box may be readily adjusted to fit any of the different width radiators. If desired box 14 may be made adjustable in a vertical direction rather than horizontally, as shown.

In operation of the apparatus described, air passing through the core of radiator 7 under natural draft due to the motion of the automobile comes in contact with the heated walls and radiating fins at the top or hottest part of the radiator core and the air passing through that area of the core to which box 14 is secured is confined within the box and forced by the draft through hose 28 and 31 into the automobile body. The box 14 is secured as near the top of the radiator core as is conveniently possible so that advantage is taken of that area of the radiator which is maintained at the highest temperature. Valve 33 as well as valve 34 may be closed when the automobile body has become comfortable and it will be seen that upon closing valve 34 to exclude the entrance of hot air into the body, if extension 37 is used, openings 38 and 39 are brought into alignment and allow the heated air to pass out of member 22 outside of dash 12 and to be directed against the motor block in order that the restriction of air flow through the radiator will be minimized. If extension 37 is not used, by adjusting valves 33 or 34 or both, the velocity of the air flowing through the heater core may be retarded by restricting the outlet openings and the temperature of the air passing into the car may be correspondingly raised. As the car body becomes heated, valves 33 and 34 may be closed, the manipulation of the latter causing opening 39 to register with opening 38 in extension 37 of valve 34. In this way member 22 may be put into communication with the space within the automobile hood and the natural circulation of air through the radiator is little affected. This is particularly desirable as the outside temperature increases on mild days during the heating season. In warm weather the simplicity of the apparatus permits its ready disconnection from the automobile and it may be again installed with equal facility at the beginning of cold weather. If desired box 14 may be provided with a suitable dash operated shutter in its back wall to permit the air to pass directly therethrough when heat is not desired in the body, or the box may be extended to cover the entire radiator with a shutter back to function as a radiator shutter as well as a heat collector.

It has been found in practice that a heater box of the character disclosed covering 6½ inches of the height of the radiator core has no apparent tendency to cause overheating of the motor at outside temperatures of 60° Fahrenheit, above which temperature there is no desirability for heat in the body. Extensive tests in practice shown that an increase in air temperature of from 60 to 100 degrees Fahrenheit is attained under operating conditions in passing through an automobile radiator core equipped with my improved heating system, the air temperatures being found to rise to within approximately 40 to 50 degrees Fahrenheit of the water temperature in the radiator core. Furthermore the volumes of heated air entering the car are such as to cause practically immediate heating of the car body to a comfortable degree within a minute or two under practical operating conditions.

It has been further found that the apparatus disclosed operates efficiently with radiator shutters or winter fronts commonly used, and while it might appear that the covering of a substantial area of the radiator core would be detrimental to the cooling system it has been found that the cooling area of the radiator during the winter months is excessive so that motors tend to run too cool during the period when a heater is desired.

It will thus be seen that a simplified efficient system and apparatus for heating automobiles or motor vehicles is provided that overcomes the objections to many heretofore proposed heating systems without impairing the efficiency of the engine cooling system and without danger of introducing obnoxious gases into the body, since fan 11, being back of box 14, forces any gases present away from the box. The heated air enters the car in as pure a state as that entering the radiator openings, and due to its rise in temperature is dry and tends to prevent clouding of the windshield due to moisture condensation in damp weather.

While my invention has been described in detail it is not restricted to such detail, the scope thereof being determined by the following claims. Accordingly, what is desired to be secured by Letters Patent and is claimed as new is:

1. In a vehicle having a body and an internal combustion engine provided with a cooling system including a cooling radiator; a chamber attached to the rear side of said radiator and covering a large portion thereof and arranged to collect air passing through said radiator under circulation caused by the movement of the vehicle; a comparatively small outlet for said chamber; and an air connection between said outlet and said body; the walls of said chamber being so arranged with respect to said outlet that the major portion of the air passing into said chamber is pocketed thereby causing a substantial temperature rise thereof to occur, while air passing through said chamber adjacent said opening attains a sufficient velocity to draw a substantial portion of said pocketed heated air with it into said body.

2. A heating system for a vehicle embodying an engine cooling system including a radiator open in front to the atmosphere and a body, comprising a shallow casing covering a substantial portion of the rear of the radiator to collect a portion of the air passing through and heated by said radiator under a draft induced by the motion of the vehicle, the rear wall of said casing being substantially perpendicular to the direction of flow of air into said casing; a comparatively restricted outlet opening in said casing; and an air connection between said opening and said body.

3. The combination as set forth in claim 1 in which said chamber is adjustable in sectional area.

4. A heating system for a motor vehicle embodying a body and an engine cooling system including a radiator open to the atmosphere, comprising an air collecting box connected to the radiator and covering a substantial portion of the width of said radiator adjacent the top thereof; said box being made up of adjustably connected sections and the rear wall thereof being substantially perpendicular to the flow of air into the box; a comparatively restricted outlet opening in said box; and an air connection between said opening and said body.

5. In motor driven vehicles means for heating and ventilating the interior thereof comprising an air collecting chamber located at the rear of and in close proximity to the upper part of the radiator and extending substantially the breadth thereof and positioned clear of the usual fan, and an air conducting pipe located below the bonnet of the engine and extending from said chamber to the interior of the vehicle, the upper part of the radiator providing an unobstructed passage therethrough to the collecting chamber wherein the air is baffled and heated prior to passing to the interior of the vehicle, the passage of the air from the exterior to the interior of the vehicle being solely due to the travel of the vehicle.

In testimony whereof I affix my signature.

LESLIE L. STEINDLER.